June 7, 1960             H. FLEISSNER            2,939,648
ROTATING JET AIRCRAFT WITH LIFTING DISC
WING AND CENTRIFUGING TANKS Filed March 28, 1955                        2 Sheets-Sheet 1

INVENTOR.
HEINRICH FLEISSNER
BY
ATTORNEY

June 7, 1960  H. FLEISSNER  2,939,648
ROTATING JET AIRCRAFT WITH LIFTING DISC
WING AND CENTRIFUGING TANKS
Filed March 28, 1955  2 Sheets-Sheet 2
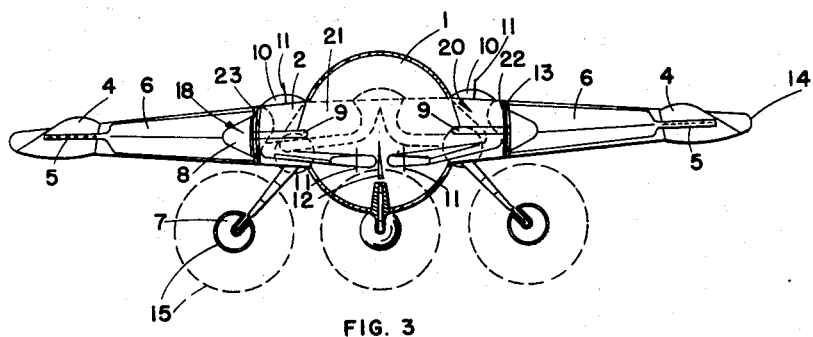
FIG. 3
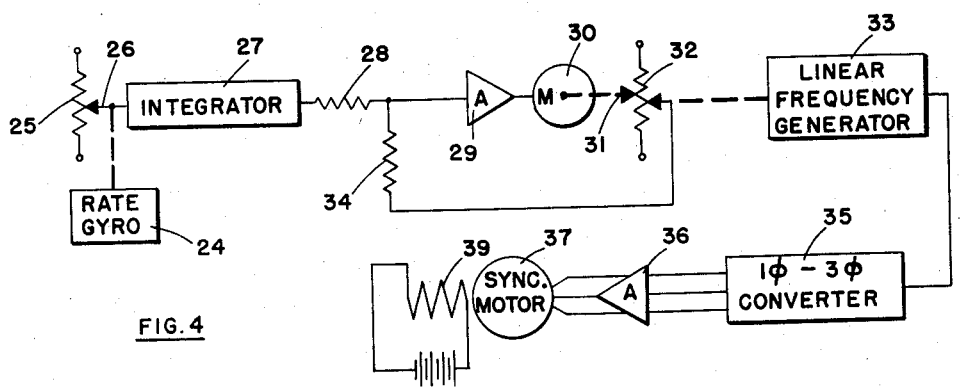
FIG. 4
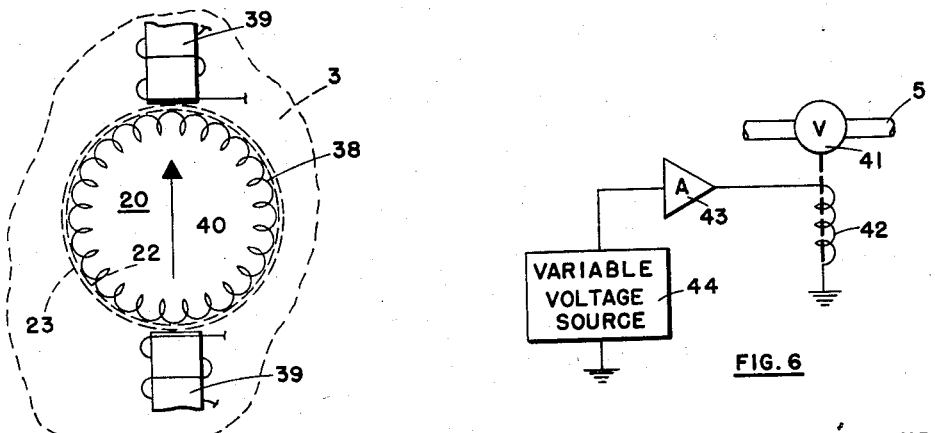
FIG. 5
FIG. 6
INVENTOR.
HEINRICH FLEISSNER
BY
*Eugene O. Heberer*
ATTORNEY

United States Patent Office 2,939,648
Patented June 7, 1960

2,939,648

ROTATING JET AIRCRAFT WITH LIFTING DISC WING AND CENTRIFUGING TANKS

Heinrich Fleissner, Dasing, uber Augsburg, Germany, assignor of one-half to Paul O. Tobeler, doing business under the name of Trans-Oceanic, Los Angeles, Calif.

Filed Mar. 28, 1955, Ser. No. 497,299

Claims priority, application Germany Mar. 27, 1954

9 Claims. (Cl. 244—12)

This invention relates to a jet powered aircraft having the configuration of a double convex-shaped disc with a spheroidal central body, and more particularly to a jet powered aircraft in which the driving jets are spaced adjacent to and around the circumference of a double convex-shaped disc which rotates around a central body which does not rotate.

In the present known airplanes which move forward with great speed so as to exceed the speed of sound, a backward thrust is created which not only affects human being adversely but also creates construction material fatigue of a high degree. This evidently is one of the greatest causes of accidents.

This aircraft has been created as a safe, very fast and highly economical flying device. It takes off from and lands vertically on any suitable ground or water surface and has the ability to remain in suspension at any point at any desired altitude regardless of weather conditions. Great maneuverability is possible and for example, an acute angle change of course can be executed. Acute angle turning is made possible by the fact that all the turning devices are in proximity to the center of the aircraft and further, the center body is the only portion that is turned in that the wing, extending outwardly therefrom, is continuously rotating and is not affected by the turning of the central body. When landing, even though jet channels or nozzles are shut off, the device has excellent balance resulting from the rotation of the disc wing.

Extremely effective use of jet fuel is achieved by employment of a relatively large number of small jet channels or nozzles which are supplied with fuel by injectors having numerous small orifices or apertures.

The all-view cabin in the non-rotating body can contain, in addition to the service and personnel rooms, any required equipment, such as air-conditioning and pressure devices, radar, steering and speed controls, and instruments.

This device has great climbing capacity in high altitudes. Its trajectory of flight is easily regulated at all times and thus eliminates all jolting movements that can be injurious to human health.

Therefore, an object of this invention is to provide an aircraft different from the conventional design by creating a disc-like rotating flying device having a lifting wing disc and a non-rotating central body comprising a spheroidal-shaped, all-view cabin which at its midsection is horizontally broadened into a truncated, tapered disc.

A principal object of this invention is to provide an improved jet powered aircraft having flight properties that do not adversely affect human being or materials.

A further object of this invention is to provide an improved jet powered aircraft which is safe, capable of high speed and very economical in operation.

A still further object of this invention is to provide a disc wing jet aircraft which is capable of taking off and landing vertically on land and water.

An object of this invention is to provide a disc wing aircraft which has the ability to remain in suspension at any point at any desired altitude regardless of weather conditions.

Another object of this invention is to provide a disc wing aircraft with great and easy maneuverability to that it can make acute angle course changes.

Other objects of invention will become apparent from the following description taken in connection with the accompanying drawings, in which Fig. 1 is a plan view of the aircraft having a portion cut away to show some of the interior and lower portions;

Fig. 3 is a partially cross-sectioned view of the wing disc with the forward portion thereof cutaway;

Fig. 4 is a schematic drawing of rate gyroscope system which maintains body 20 irrotational;

Fig. 5 shows the synchronous motor 30 of Fig. 4 in detail; and

Fig. 6 shows the solenoid valve circuit for controlling flow of fuel into fuel injector 5.

Figure 1:
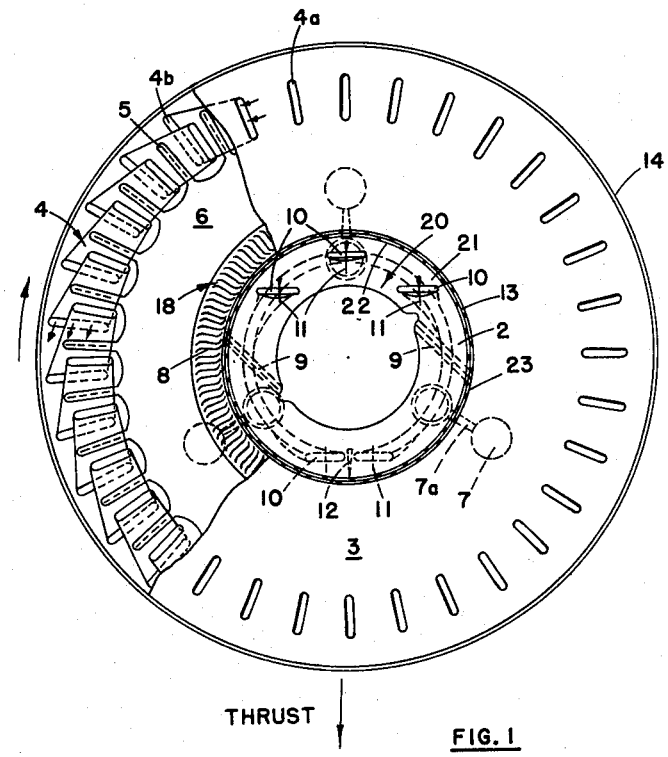
Figure 2:
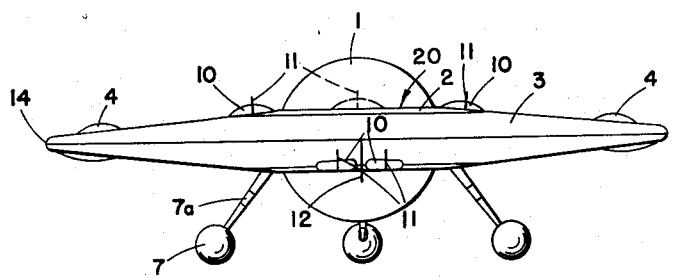
Fig. 2 is an elevation view of the disc wing aircraft looking from the rear.

Referring to Figs. 1–3, truncated disc-shaped platform 2 extends horizontally and radially outward from the spheroidal-shaped, multi-view cabin 1. Platform 2 extends from the approximate horizontal midsection of cabin 1 and they together form body 20 within double convex or V-shaped tapered disc wing 3. Wing disc 3 has its greatest thickness adjacent platform 2 and tapers symmetrically, radially outward from its hollow central portion 21 in which body 20 is situated. The circumference formed in disc 3 around hollow central portion 21 is concentric with disc 3, as is the circumference of body 20 formed around truncated disc-shaped platform 2. Disc wing 3 is surrounded by metal rim 14. A bearing surface area 13 is formed between circumference 22 of body 20 around platform 2 and circumference 23 formed around hollow central portion 21 of disc 3. Bearing surface area 13 can be provided by multiple double ball or roller bearings.

In platform 2 of body 20 are rotation-starting rockets 9. They are spaced and directed to fire away from body 20 and into bucket vanes 8 of starting turbine 18 located around and open to inner circumference 23 of disc 3 formed around hollow central portion 21. Rockets 9 are placed in position substantially tangent to cabin 1. They are fired from within cabin 1 through openings in circumference 22 to start the rotation of disc 3 by their thrusting forces and continue to be fired until sufficient rotating speed is achieved to allow jet channels or nozzles 4 to be activated.

As the starting rockets are fired for only a short period of time, the disposition of their exhaust may be easily handled in the turbine blading and the surrounding space. As may be seen in Fig. 1, there is considerable space between and around the blades of turbine 18 for the expansion of the rocket gases. Further, the rockets may fire into the turbine at only two points and after the blades move away from these points, there is a considerable period during which the gases may be expanded and leak out along the inner circumference of the casing or through some other opening or openings which may be made in the turbine casing.

Immediately outboard of vanes 8 are fuel tanks 6 which rotate with disc 3 and this rotation develops a centrifuging action to feed fuel into fuel injectors 5. Fuel flows into injectors 5 from tanks 6 and amounts can be varied to individual injectors by electromagnetic means, such as variable solenoid valves (not shown in Figs. 1–3) operated in cabin 1 and shown in Fig. 6. Fuel injectors 5 extend into jet channels 4 in a substantially horizontal, radially outward direction and are tubeshaped, having a number of small openings or apertures to allow for an even and economical distribution of fuel. The type of openings in injectors 5 depend upon the kind of fuel used, which can be liquid, dust, powder, gas or solid. Ignitors, not shown, can be employed in injectors 5, if necessary, depending upon the fuel used. They can be pyrotechnics or electrically operated types.

Jet channels 4 are spaced evenly around the outer circumference of disc 3 and they are shown to have the cross-section of an elongated slot having two sides substantially parallel but can be of other design configurations. They extend through disc 3 from top to bottom and are sloped away from the vertical, with the top toward the direction of rotation. They are open to the top and bottom external surfaces of disc 3 and are closed to the interior of disc 3 except for their connection with fuel tanks 6 by injectors 5. Channels or nozzles 4 have similar cross-section from top to bottom, except that the cross-section is progressively elongated on the way down from the top so that the bottom is considerably longer than the top. When disc 3 starts to rotate, the upper slots 4a of channels 4, being toward the direction of rotation and the lower slots 4b being sloped away from it, the former act as intake suctions and through the latter, after burning of the fuel, a thrusting force is exerted downward and in the direction of rotation. This thrust action gives the disc wing its vertical uplift.

Jets of the configurations shown when rotated at high speeds cause a sufficient amount of air to enter them so that they will function efficiently as ram jets. The fact that the inlets are open toward the direction of rotation and that the discharges are in the opposite direction effects, in itself, a scooping action to cause considerable air to be forced into the inlets. Additional scooping action occurs because the openings of the jets extend above the main surface of the wing 3, as may be seen in Figs. 2 and 3. The inlets, as shown in Fig. 1, may appear somewhat out of proportion in size to the remainder of the drawing. Their exact size is a matter of design to be determined in the practice of the invention.

The level horizontal flight of the aircraft is made possible by means of a plurality of air-flow ducts 10 which, in body 20, are arranged to extend from the front top side to the rear bottom side at the midportion. Air enters openings in ducts 10 external of and at the front of body 20 and is discharged external of and at the rear of body 20. Main steering control rudder or vane 12 is located on the rearward bottom of body 20 midway between the discharge openings of ducts 10. Further steering is made possible by means such as vanes 11 within ducts 10 or directly external of their discharge openings.

Non-rotation of body during flight is achieved by electromagnetic fields which can be imposed upon disc 3 and body 20 in various ways so as to counteract the direction of rotation of the disc wing. As shown in Fig. 4, one system which would give the desired result employs rate gyroscope 24 which is attached to nonrotating body 20 with its sensitive axis parallel to the azimuth axis of the body. Rate gyroscope 24 generates a torque about its output axis which is proportional to the angular velocity about its input axis. This torque is customarily measured by a spring (not shown). The motion of rate gyroscope 24 about its output axis against the spring is customarily measured by means of an electrical device, such s a synchro or potentiometer. As shown in this figure, potentiometer 25 is used and has its wiper arm 26 mechanically driven by rate gyroscope 24.

An electrical voltage source (not shown) is connected against the stationary terminals of potentiometer 25. The electrical voltage generated upon wiper arm 26 of potentiometer 25 is therefore proportional to the angular velocity measured by rate gyroscope 24. Wiper arm 26 is connected to the input of integrator 27 where the signal is integrated. The output of integrator 27 is connected through impedance matching resistor 28 to the input of servo amplifier 29 which is connected by its output to drive motor 30. Motor 30 is is mechanically connected to drive the wiper arm 31 of potentiometer 32 and to drive the frequency controller of frequency generator 33. Wiper arm 31 of potentiometer 32 is connected through impedance matching resistor 34 to form a feedback loop to the input of servo amplifier 29. The shaft rotation of motor 30 therefore, in accordance with servo art, has a rotation proportional to the voltage output of integrator 27. Frequency generator 33 is a linear frequency generator which has an electrical output whose frequency is proportional to the shaft rotation of motor 30. Frequency generator 33 generates a single phase voltage which is connected to the input of converter 35 which changes the single phase voltage to a three phase voltage. A three phase voltage output of converter 35 is then connected through three phase amplifier 36 to the A.C. winding of synchronous motor 37. Synchronous motor 37 has its A.C. winding 38 preferably around the periphery of body 20, as shown in Fig. 5. The A.C. winding of synchronous motor 37 may be, for example, of the ring type or of the salient pole type. The D.C. field windings 39 of synchronous motor 37 are upon rotating disc 3. Vector 40 is the resultant of the fields in winding 38 and is shown in position to prevent rotation of body 20.

The electro-mechanical device which maintains body 20 irrotational operates as follows:

When rate gyroscope 24 detects an angular velocity, regardless of how the angular velocity is caused, it generates a signal which is integrated by integrator 27 to increase the frequency of the voltage applied to A.C. windings 38, to thereby cause the electrical field which is generated to rotate synchronously with the external disc 3.

Referring to Fig. 6, showing an electrical circuit for the operation of solenoid valves 41 in injector 5, a variable voltage source 44 is connected through amplifier 43 to solenoid coil 42. Valves 41 can be opened to any certain position by varying the voltage in cabin 1.

The hydraulically operated retractable landing gear has three legs 7a, one end of each being directed downward and the other end of each being secured in body 20. On the lower ends of the legs are ball-like pneumatically inflatable buffers 7 which provide an elastic, cushioned touching of the ground when landing. For landing and taking off from water, elastic expandable outer skins 15 are provided to cover ball-like buffers 7 and are pneumatically inflated from cabin 1.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A disc wing jet aircraft comprising a double convex shaped disc having a radially outward directed taper from its center, said disc having an open central portion about its geometrical center, said open portion being concentric with the circumference of said disc, a circular body within said central portion and concentric to said disc, said disc and said body having a common vertical axis, said disc mounted to rotate on said body in a plane perpendicular to their common axis, rocket means within said body directed to exhaust away from said body and toward said disc, bucket vanes in said disc adjacent to said body in position to receive said exhaust from said rockets, fuel tanks outward of said vanes in said disc, jet channels in said disc adjacent the circumference thereof and outward of said tanks; fuel injectors outward of said tanks and connected thereto, extending into said jet channels; air-flow ducts within said body for achieving horizontal flight of said aircraft, steering means, and electromagnetic means within said body and said disc to prevent the rotation of said body.

2. A disc wing aircraft comprising a double convex-shaped disc having a radially outward directed taper from its center, said disc having an open central portion about its geometrical center, said open central portion being circular and concentric with the circumference of said disc, a circular body within said central portion and concentric to said disc, said disc and said body having a common vertical axis, said disc mounted to rotate on said body on said common axis, a plurality of rockets within said body directed to exhaust away from said body and toward said disc, bucket vanes in said disc adjacent to and surrounding said body in position to receive the thrust from said rockets, fuel tanks outward of said vanes in said disc, a plurality of fan-shaped jet channels in said disc adjacent to the circumference thereof and outward of said tanks; fuel injectors outward of said tanks and connected thereto, extending into said jet channels; a plurality of air-flow ducts extending through said body in a generally forward to aft direction, said ducts being open adjacent and to the forward surface of said body to allow entry of air and said ducts being open adjacent and to the after surface of said body to allow discharge of said air, steering vanes external of and adjacent to said ducts, and electromagnetic means within said body and said disc to prevent the rotation of said body.

3. A disc wing aircraft according to claim 2 wherein said body comprises a central, all-view spheroidal-shaped cabin having a tapered truncated disc-shaped platform extending generally horizontally and radially outward therefrom at its approximate vertical midsection, said platform extending to the circumference of said body and said taper being substantially the same as that of said disc, said body and said disc having bearing surfaces therebetween on which said disc rotates about said body.

4. A disc wing aircraft according to claim 2 wherein said body comprises a central, all-view spheroidal-shaped cabin having a tapered truncated disc-shaped platform ex-extending generally horizontally and radially outward therefrom at its approximate vertical midsection, said platform extending to the circumference of said body and said taper being substantially the same as that of said disc, said body and said disc having bearing surfaces therebetween on which said disc rotates about said body, said rockets being open in said circumference of said body and extending in said body in directions substantially tangent to said spheroidal-shaped cabin.

5. A disc wing aircraft according to claim 2 in which said jet channels are spaced within and around said circumference of said disc, each of said channels extending from the top of said disc in a sloping direction away from the vertical to the bottom of said disc, each of said channels being open to the exterior of said disc at the top and bottom thereof, said opening at said top being an elongated slot, said opening at said bottom being an elongated slot of greater length than said first-mentioned slot, and said fuel injectors extending in a substantially horizontal direction from said tanks into said channels, a plurality of openings in said injectors to evenly distribute fuel from said tanks into said channels, electromagnetic means to regulate the quantity of fuel flowing from said tanks to said elements.

6. A disc wing aircraft according to claim 2 further comprising a retractable landing gear having three legs with one end of each directed downward from said body when said gear is extended, each of said legs having its other end secured in said body, said one end of each leg having a ball-shaped buffer secured thereon, and each of said buffers having a pneumatically expandable skin surrounding said buffer.

7. A disc wing aircraft comprising double convex-shaped disc having a radially outward directed taper from its center, said disc having an open central portion about its geometrical center, said open central portion being circular and concentric with the circumference of said disc, a circular body within said central portion and concentric to said disc, said disc and said body having a common vertical axis, said disc mounted to rotate about said body on said axis, said body having a central, all-view, spheroidal-shaped cabin having a tapered truncated disc-shaped platform extending generally horizontally and radially outward therefrom at its approximate vertical midsection, said platform extending to the circumference of said body and said taper being substantially the same as that of said disc, said body and said disc having bearing surfaces therebetween on which said disc rotates about said body, a plurality of rockets within said body directed to exhaust away from said body and toward said disc, said rockets being open in said circumference of said body, bucket vanes in said disc adjacent to and surrounding said body in position to receive the thrust from said rockets, tapered fuel tanks outward of said vanes in said disc, a plurality of fan-shaped jet channels in said disc adjacent to the circumference thereof and outward of said tanks; said jet channels being spaced within and around said circumference of said disc, each of said channels extending from the top of said disc in a sloping direction away from the vertical to the bottom of said disc, each of said channels being open to the exterior of said disc at said top and bottom thereof, said opening at said top being an elongated slot, said opening at said bottom being an elongated slot of greater length than said first-mentioned slot; fuel injectors outward of said tanks and connected thereto, extending into said jet channels; said injectors extending in a substantially horizontal direction from said tanks into said channels, a plurality of openings in said injectors to evenly distribute fuel from said tanks into said channels, a plurality of air-flow ducts extending through said body in a generally forward to aft direction, said ducts being open adjacent and to the forward surface of said body to allow entry of air and said ducts being open adjacent and to the after surface of said body to allow discharge of said air, steering vanes external of and adjacent said ducts, electromagnetic means within said body and said disc to prevent the rotation of said body, electromagnetic means to regulate the quantity of fuel flowing from said tanks to said elements, a retractable landing gear having three legs with one end of each directed downward from said body when said gear is extended, each of said legs having its other end secured in said body, said one end of each leg having a ball-shaped buffer secured thereon, and each of said buffers having a pneumatically expandable skin surrounding said buffer.

8. A disc wing jet aircraft comprising a double convex-shaped disc having a hollow central portion concentric to and within said disc, said disc tapering radially outward from said central portion, a body within said central portion and concentric to said disc, said disc and said body having the same vertical axis, said disc mounted to rotate on said body on said axis, means within said body to actuate means within said disc to cause said disc to start rotating about said body, means within said body to lift said body and said disc, means within said body to achieve horizontal flight for said aircraft, means on said body to steer said body and said disc, and means within said body and said disc to prevent the rotation of said body when said disc is rotating.

9. A disc wing jet aircraft comprising a disc having an open central portion concentric thereto, a body within said central portion and concentric to said disc, said disc and said body having a common vertical axis, said disc mounted to rotate about said body on said axis, means within said body to actuate means within said disc to cause said disc to start rotating about said body, means within said disc to lift and drive said body and said disc, means on said body to steer said body and said disc, and means within said body and said disc to prevent the rotation of said body when said disc is rotating.

References Cited in the file of this patent

FOREIGN PATENTS

| | | |
|---|---|---|
| 706,924 | Great Britain | Apr. 7, 1954 |
| 1,018,196 | France | Oct. 8, 1952 |
| 1,067,244 | France | Jan. 27, 1954 |
| 1,085,378 | France | July 28, 1954 |